United States Patent

Wilfert

[15] 3,690,195
[45] Sept. 12, 1972

[54] SAFETY CONTROL LEVER
[72] Inventor: Thomas Wilfert, Friedhofstrasse 21, 7021 Stetten, Germany
[22] Filed: Dec. 31, 1970
[21] Appl. No.: 103,058

[30] Foreign Application Priority Data
March 19, 1970 Germany..........P 20 13 164.0

[52] U.S. Cl......................74/473 R, 74/523, 74/543, 287/103
[51] Int. Cl...............................................G05g 9/00
[58] Field of Search.........74/473 R, 473 P, 524, 523, 74/543; 287/3, 103

[56] References Cited

UNITED STATES PATENTS 1,719,368  2/1929  Hibbets....................74/473 P
3,561,281  2/1971  Wilfert....................74/473 R Primary Examiner—William F. O'Dea
Assistant Examiner—F. D. Shoemaker
Attorney—Walter Becker

[57] ABSTRACT

A safety control lever, especially for shift-stick controlled transmissions of motor vehicles, in which the control lever has two lever sections normally interconnected by coupling means which in response to the application of an excessive shifting force to the control lever permits a certain sliding movement of the coupling means relative to each other against a spring without disengagement of the coupling means, while the coupling means will, however, almost immediately disengage each other in response to a sudden shock-like excessive action upon the control lever.

9 Claims, 3 Drawing Figures

PATENTED SEP 12 1972
3,690,195
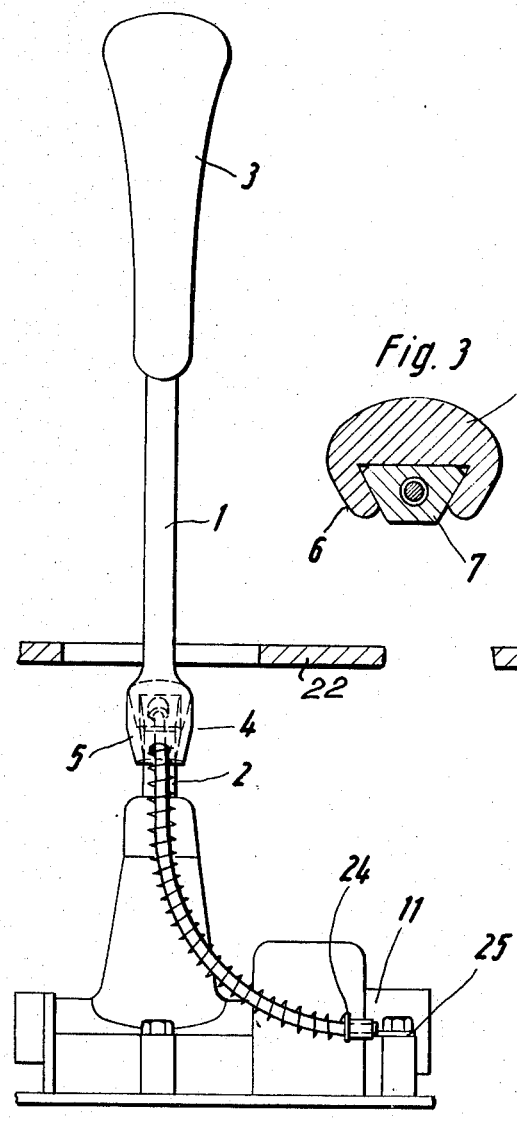
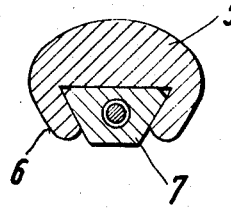
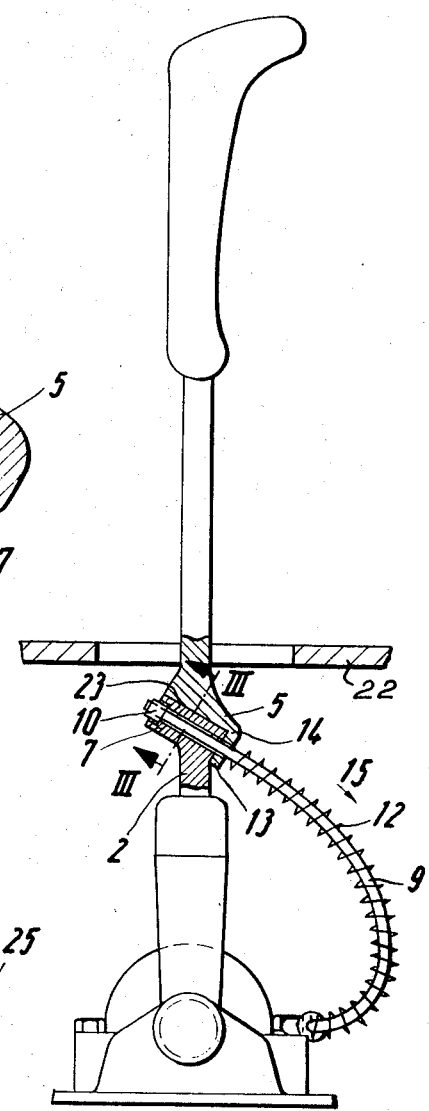
Inventor:
Thomas Wilfert
By
Walter Becker

SAFETY CONTROL LEVER

In my copending application Ser. No. 757,846 filed Sept. 6, 1968 titled "safety Control Lever" and matured into U.S. Pat. No. 3,561,281 issued Feb. 9, 1971 there has been described a safety control lever, especially for the shift stick of motor vehicle transmissions, which has coupling means interconnect adjacent end portions of first and second lever sections forming longitudinal extensions relative to each other, the interconnection of the coupling means being operable automatically to yield for safety disengagement of the two lever sections in response to a shock-like load acting on one of the lever sections. In this way, in response to a shock-like load exerted upon the control lever, the power connection is overcome in the direction of the coupling in such a way that the coupling members are disengaged from each other and thus the lever carrying handle evades the shock-like load.

It has been found that in exceptional instances, namely when the safety lever is actuated in a particularly rough manner, it may happen that the power connection between the two lever sections will during the actuation of the control lever be overcome with the result that the two lever sections will be disengaged from each other in an undesired manner.

It is, therefore, an object of the present invention to further improve the safety control lever means set forth above in such a way that the above mentioned drawbacks concerning an accidental disengagement of the lever sections will be avoided.

This object and other objects and advantages of the invention will appear more clearly from the following specification in connection with the accompanying drawing, in which:

FIG. 1 is a front view of the safety control lever according to the present invention.

FIG. 2 illustrates the control lever of FIG. 1 partly in vertical section and partly seen from the left (with regard to the drawing).

FIG. 3 represents a section taken along the line III—III of FIG. 2 but on a larger scale than that of FIGS. 1 and 2.

The safety control lever according to the present invention is characterized primarily in that the coupling elements of the two lever sections are movably interconnected in such a way that they will resist the normal force customarily exerted for disengaging the coupling elements with an increasing spring characteristic and over a shifting stroke of the control lever. The shifting stroke corresponds to the stroke of the coupling elements necessary for the disengagement thereof. The spring force is so selected that the lever sections will not move relative to each other as a result of the normal force required for effecting a shifting of the control lever. Only when the operator or driver exerts a higher force upon the control lever, in other words a force which is higher than the force required for the shifting operation proper, that lever part or section which carries the handle is moved relative to the other lever part against the thrust of the spring while this force increases due to the increasing spring characteristic. Accordingly the operator, due to the resilient yielding of the lever, will feel that the exerted force is too high and should be corrected. It is also possible under certain circumstances to provide a linear or decreasing spring characteristic.

Referring now to the drawing in detail, the safety control lever illustrated therein comprises two rectilinearly serially arranged lever sections 1, 2. These sections are substantially cylindrical and are of different length respectively. The longer lever section 1 has that end thereof which is remote from the lever section 2 provided with a handle 3.

The two lever sections 1 and 2 are interconnected by a spring biased slip joint sliding joint and coupling 4. The coupling 4 is formed by a guiding member 5 with an undercut groove 6 and a plug member 7. The guiding member 5 is located at that end of lever section 1 which is remote from the handle 3 and forms one end with the lever section 1. The plug member 7 is provided on the corresponding end of the other lever section 2 and forms a single piece therewith.

Both coupling members 5, 7 are engaged by a spring 12 in such a way that these members are movably connected to each other against the thrust of spring 12 over a predetermined stroke extending up to the point of disengagement of the coupling members. The guiding member 5 is secured by an abutment forming a front end face 14 in a direction counter to the direction indicated by the arrow 15 in the last mentioned direction the coupling guide member 5 can be displaced relative to the coupling plug member 7. The abutment 14 rests against the pertaining end face 13 of the plug member 7 under the influence of the force of spring 12. The free end face of the abutment 14 serves in a simple manner as surface of engagement for spring 12.

Spring 12 is furthermore by way of an intermediate member 9 supported by the plug member 7. Thus the two coupling members 5, 7, when occupying their rest position, are braced in a simple manner by the spring 12. The intermediate member 9 is formed by a pulling element, namely a cable, which is passed through bores provided in alignment with each other and parallel to the direction indicated by the arrow 15. The intermediate member 9 is supported by a nut 10 at that end face of the plug member 7 which faces away from the abutment 14. Nut 10 is arranged in an end section of the bore 23 of the plug member 7 and the end section has an enlarged diameter relative to the nut.

The flexible pulling member 9 which is surrounded by spring 12 and supports the latter affords the possibility of supporting spring 12 in a safe manner at a suitable portion of the motor vehicle in spite of the relatively great length of spring 12, while at the corresponding end of the pulling member 9 there is provided a connecting element 11 which in the particular embodiment illustrated in the drawing is connected to a support for the shift linkage of the motor vehicle. The connecting member 11 has an abutment collar or washer 24 for pressure spring 12 and furthermore has an eye 25 which is held in its position, for instance, by being clamped into the respective position. A connecting screw 26 may be passed through the eye 25.

As will be seen from FIGS. 1 and 2, the disengaging direction of the lever section 1 as indicated by the arrow 15 is an inclined downward direction. The dovetail-shaped groove of the coupling member 5 is, in the direction counter to the disengaging direction indicated by the arrow 15, widened similar to the plug member 7. In this way these parts, in the rest position of coupling 4, will snugly engage each other in view of the thrust of spring 12. Thus a rattling of coupling 4, for instance, in response to vibrations of other parts of the vehicle cannot occur. Inasmuch as spring 12 engages the front side of coupling 4, it will not interfere with any other parts. Moreover, the coupling 4 may be so designed that it is located below the bottom plate 22 of the passenger compartment of the vehicle and, more specifically, within a linkage tunnel of the motor vehicle or at another protected area.

When the handle 3, during a shifting operation of the safety control lever, introduces an excessively high force, the coupling member 5 will move against the thrust of spring 12 in the direction indicated by the arrow 15 relative to the plug member 7. This is clearly felt by the operator actuating the control lever so that he will be able to correct the shifting action. When a shock-like load occurs, as may happen when the operator as a result of an accident hits the control lever, the coupling member 5 will move against the thrust of spring 12 over the entire stroke over which it is displaceable on the plug member 7 so that the coupling member 5 will completely disengage the plug member 7. While in such an instance the lever member 1 remains guided by the pulling member 9, it can nevertheless pivot about the central axis of the pulling member 9, for instance, in downward direction.

In the illustrated embodiment, the coupling members 5 and 7 are illustrated with a dovetail profile. It is, however, also possible instead of using a dovetail profile to utilize another, for instance, rounded profile which will assure the guiding in the longitudinal direction. Furthermore it is possible that the ends of the guiding profile protrude beyond the guiding means for the coupling member 5 and that they are rounded so that in a most unfavorable situation injuries due to sharp edges will be avoided. Moreover, the lever may be guided in a still simpler manner on the rounded ends of the coupling member 7 acting on the guiding member after the coupling members have disengaged each other.

It is, of course, to be understood that the present invention is, by no means, limited to the particular structure shown in the drawing but also comprises any modifications within the scope of the appended claims.

What I claim is:

1. A safety control lever, especially for shift-stick operable motor vehicle transmissions, which includes: a first lever section, a second lever section forming the longitudinal extension of said first lever section, coupling means respectively associated with and positively interconnecting adjacent end portions of said first and second lever sections held normally positioned while being adapted to permit said lever sections to move relative to each other and eventually to disengage each other, and spring means positively associated with said coupling means and operable to prevent said lever sections from moving relative to each other as long as the shifting pressure exerted upon said lever is within the magnitude of the shifting pressure normally required for shifting the control lever, said spring means also being operable in response to said shifting pressure exceeding said magnitude to permit a movement of said lever sections relative to each other while causing said spring means to increasingly be compressed and loaded, said spring means additionally being operable in response to a sudden shock-like force greater than the thrust of said spring means when the latter is compressed over the possible maximum stroke of said coupling means to permit said coupling means to move relative to each other while in engagement with each other up to the point of disengaging each other to allow said lever sections to be completely disconnected from each other.

2. A safety control lever, especially for shift-stick operable motor vehicle transmissions, which includes: a first lever section, a second lever section forming the longitudinal extension of said first lever section, coupling means respectively associated with and interconnecting adjacent end portions of said first and second lever sections while being adapted to permit said lever sections to move relative to each other and eventually to disengage each other, and spring means associated with said coupling means and operable to prevent said lever sections from moving relative to each other as long as the shifting pressure exerted upon said lever is within the magnitude of the shifting pressure normally required for shifting the control lever, said spring means also being operable in response to said shifting pressure exceeding said magnitude to permit a movement of said lever sections relative to each other while causing said spring means to increasingly be compressed and loaded, said spring means additionally being operable in response to a sudden shock-like force greater than the thrust of said spring means when the latter is compressed over the possible maximum stroke of said coupling means to permit said coupling means to move relative to each other while in engagement with each other up to the point of disengaging each other to allow said lever sections to be completely disconnected from each other, said spring means being formed by a helical pressure spring, and a pulling member extending through said helical pressure spring and at least partially through said coupling means.

3. A control lever according to claim 2, in which said spring means located externally acts transversely directly on one of said coupling means and acts indirectly on the other one of said coupling means.

4. A control lever according to claim 2, in which said pulling member is formed by flexible cable means.

5. A control lever according to claim 4, in which that end of said cable means which is remote from said coupling means is connectable to a fixed element and is provided with abutment means for abutting the adjacent end of said spring means.

6. A control lever according to claim 4, in which said coupling means are provided with two aligned bores, and in which that end of said cable means which is adjacent said coupling means is located in said bores, nut means threadedly connected to the free end portion of said last mentioned end resting against one of said coupling means.

7. A control lever according to claim 6, in which that one of said bores which is located in the coupling means pertaining to said first lever section is provided in an ear integral with said last mentioned coupling means and forming an abutment for one end of said spring means.

8. A control lever according to claim 2, in which for purposes of disengaging the coupling means from each other said first lever section is manually shiftable so as to move the coupling means connected thereto in a downwardly inclined direction while causing said last mentioned coupling means simultaneously to compress said spring means.

9. A safety control lever, especially for shift-stick operable motor vehicle transmissions, which includes: a first lever section, a second lever section forming the longitudinal extension of said first lever section, coupling means respectively associated with and interconnecting adjacent end portions of said first and second lever sections while being adapted to permit said lever sections to move relative to each other and eventually to disengage each other, and spring means associated with said coupling means and operable to prevent said lever sections from moving relative to each other as long as the shifting pressure exerted upon said lever is within the magnitude of the shifting pressure normally required for shifting the control lever, said spring means also being operable in response to said shifting pressure exceeding said magnitude to permit a movement of said lever sections relative to each other while causing said spring means to increasingly be compressed and loaded, said spring means additionally being operable in response to a sudden shock-like force greater than the thrust of said spring means when the latter is compressed over the possible maximum stroke of said coupling means to permit said coupling means to move relative to each other while in engagement with each other up to the point of disengaging each other to allow said lever sections to be completely disconnected from each other, one of said coupling means being rigidly connected to a manually shiftable lever section and having a groove with walls tapering toward the outside, and the other one of said coupling means being of a trapezoidal contour slidably fitting into said tapering groove.

* * * * *